Oct. 30, 1928. Re. 17,121

J. R. McWANE

MEANS FOR SUPPORTING CORE BARS IN FLASKS

Original Filed May 9, 1925 2 Sheets-Sheet 1

Inventor,
James R. McWane,

By Philip E. Siggers
Attorney

Oct. 30, 1928. Re. 17,121
J. R. McWANE
MEANS FOR SUPPORTING CORE BARS IN FLASKS
Original Filed May 9, 1925 2 Sheets-Sheet 2
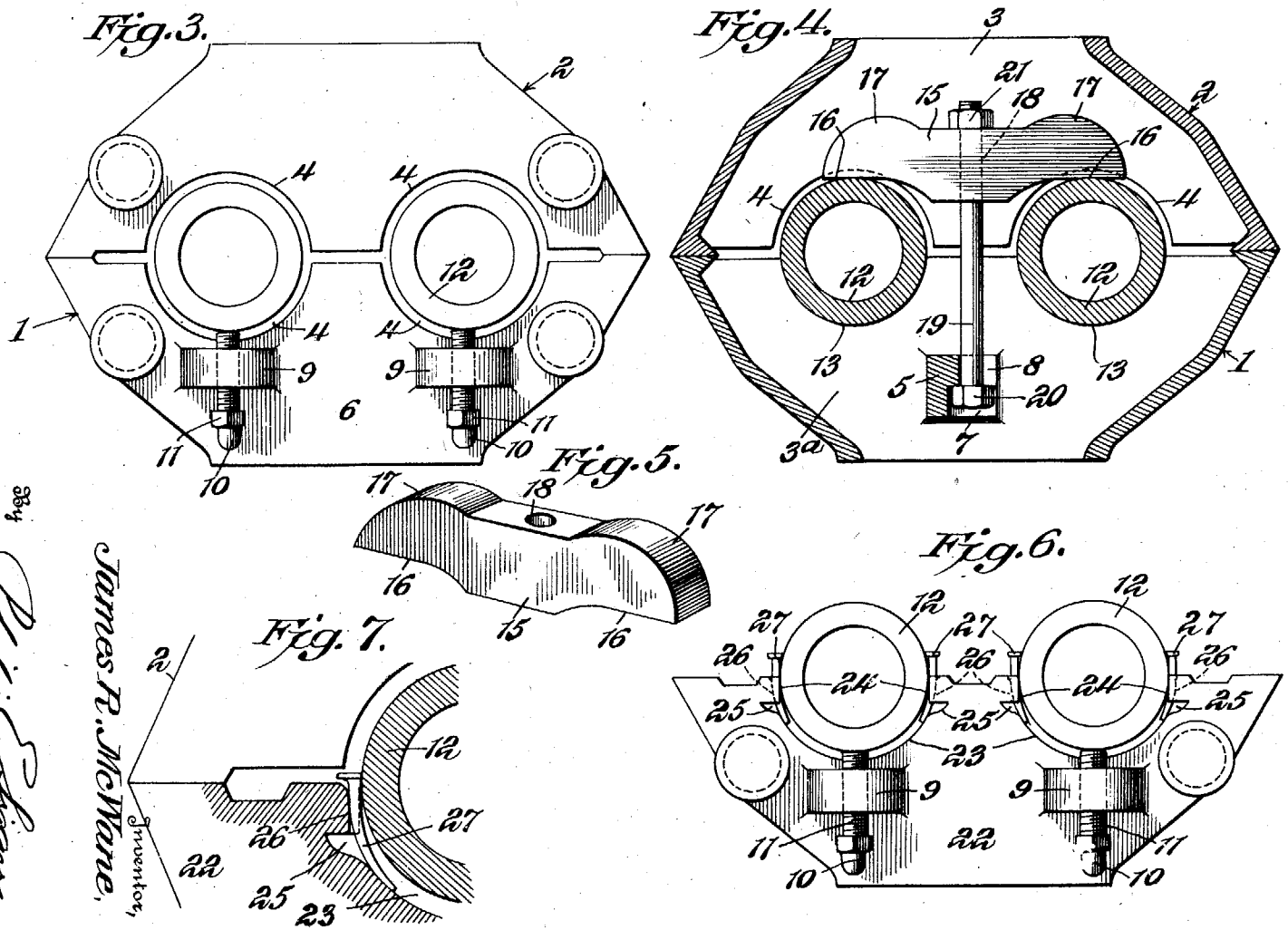
Inventor,
James R. McWane,
By Philip E. Liggett
Attorney Reissued Oct. 30, 1928.

Re. 17,121

UNITED STATES PATENT OFFICE.

JAMES R. McWANE, OF BIRMINGHAM, ALABAMA.

MEANS FOR SUPPORTING CORE BARS IN FLASKS.

Original No. 1,601,450, dated September 28, 1926, Serial No. 29,094, filed May 9, 1925. Application for reissue filed July 25, 1928. Serial No. 295,284.

This invention relates to method of and means for supporting core bars in flasks, and is designed as an improvement on the structure shown and described in Patent No. 1,578,083, dated March 23, 1926, on means for supporting core bars in flasks.

The object is to improve and to strengthen the means for holding the elongated core bars, with the sand cores thereon, which are necessarily used in the making of cast iron pipe or other similar tubular castings by the horizontal method of casting, wherein the cope and drag sections comprising the flask are fitted together in a horizontal position, with the two halves of the mold formed therein and the cores in position ready for the pouring of the metal.

Another object is to provide holding or supporting means which engage the ends of the core bars and clamp the bars sufficiently to stiffen the same and take up any sagging and resist movement at their intermediate portions due to their relatively great length and weight, it being understood that the use of ordinary chaplets is entirely dispensed with in the present method of supporting the cores. By supporting the core bar at two points on each end and clamping the bar down on these two points, the bar becomes what is known in mechanics as a continuous beam, as opposed to a simple beam, and thereby is made much more rigid.

A further object is to provide means which may be adjusted to impart a downward flexing of the core bars at their intermediate portions, so that the latter are eccentrically disposed relative to the surrounding walls of the molds, such adjustment being made with a nicety sufficient to allow said core bars with the cores thereon to be forced upwardly to the exact center of the molds by the incoming flow of the molten metal, which tends to float the bars and cores, and thus produce castings having walls of uniform thickness, such flexing having the effect of placing the core bars under sufficient tension to prevent any further sagging of the same, prior to the pouring operation.

A full and complete understanding of the invention may be obtained from a consideration of the following detailed description, taken in connection with the accompanying drawings forming a part of this specification, it being understood that while the drawings show practical forms of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:—

Figure 3 is an end elevation of the flask drawn on a larger scale.

Figure 4 is a transverse section taken on the line 4—4 of Figure 1.

Figure 5 is a detail perspective view of the clamping yoke used in tensioning the core bars.

Figure 6 is an end elevation of a drag section having slightly modified means for engaging the ends of the core bars.

Figure 7 is an enlarged detail partly in section, of the same.

Figure 1:
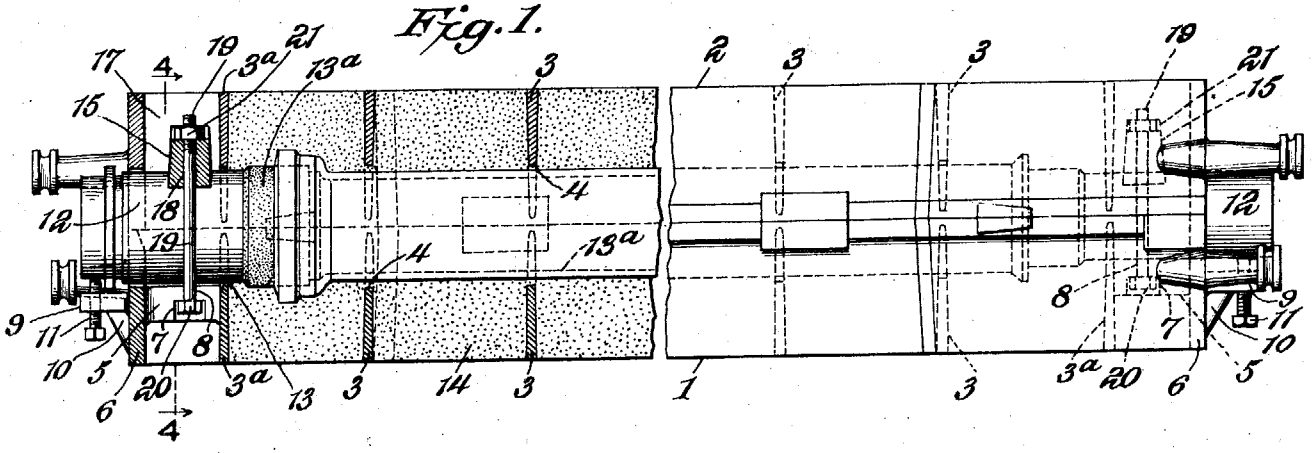
Figure 1 is a side elevation partly in section of a flask having an embodiment of the invention applied thereto and showing the core being supported and a portion of the casting surrounding the core.
Figure 2:
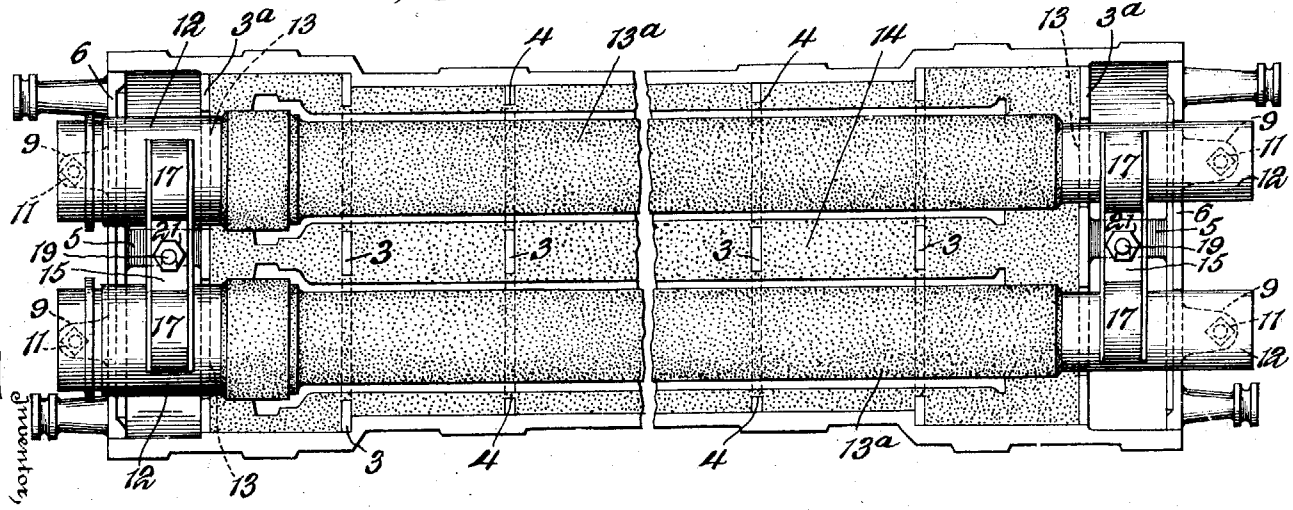
Figure 2 is a plan view of the drag section of a double pipe flask, the cores being held in position by the improved means.

Referring to the drawings, there is shown a double flask used in the manufacture of cast iron pipe by the horizontal method, the said flask comprising a lower or drag section 1 which is adapted to be placed upon the floor of the foundry in an inverted position, and a superimposed cope section 2, formed in all main respects the same as the drag section, except with some minor details, and adapted to rest upon the drag in reverse position, and to be rigidly connected to the same by suitable clamps, or in any other desired manner, to prevent relative movement of the flask sections during the pouring of the metal.

The cope and the drag sections are each formed of suitable cast metal so as to stand repeated use, and are in the form of boxes open at the top and bottom, their abutting edges being considerably wider than their other edges, as clearly shown in Figures 3 and 4.

Each section is provided with a plurality of spaced and alined transverse webs 3 and $3^a$ integrally joining the longitudinal side wall thereof to strengthen the same and to hold the mold sand in position, there being suitable, centrally disposed, semi-circular openings 4 formed in the long, or abutting edges of the transverse webs, and also the end walls, which, when the two sections are properly positioned for use, form complete circular openings of sufficient diameter to permit of a continuous sand mold to be made throughout the length of the casting.

Each drag section is formed, at each end, with a longitudinally disposed arm 5, which is integrally connected at its outer end, to the inner face of the end wall 6 of the drag, and at its inner end to the next adjacent transverse web 3ª, the arm being located substantially midway between the sides of the drag, and having formed in its lower face a recess 7, provided with a narrow entrance slot 8, for receiving the shank of an adjusting tie bolt to be described.

Each drag section is also provided at each end with a pair of outwardly extending, horizontally disposed lugs 9, preferably formed integrally therewith and slightly below the openings 4 therein, the centers of said lugs lying in the same vertical planes with the centers of said openings and the lugs being provided with strengthening webs 10 beneath the same.

Vertically disposed set screws 11 are adapted to be threaded through the outer portions of the lugs 9, the active ends of the same being directed upwardly to contact beneath the exact centers of the extended ends of tubular core bars 12, which contact with the arcuate walls 13 of the transverse webs 3ª which have been machined as seats for the core bars 12.

The core bars 12 with the cores proper 13ª formed of suitable sand thereon, are lowered into the lower half 14 of the mold already formed in the drag section and onto the machined seats 13, an exact positioning of the ends of the core bars being thus effected when the core bars are seated.

Adapted to coact with the aforesaid arms at each end of the flask is a yoke member 15, formed preferably of a heavy, solid casting of proper metal, and provided on its under face, at each end, with a flat seat 16 adapted to press down upon the core bars where they extend beyond the ends of the sand core proper. The yokes are further provided with end enlargements 17 of arcuate form on their upper faces to strengthen the terminals of the same, and a central, vertical aperture 18 extends therethrough for the reception of a tie bolt 19, having a head 20 at its lower end which is adapted to be easily and quickly fitted into the aforesaid seat or recess 7, in the arm 5 beneath the same, by moving the bolt transversely into the entrance slot 8, as will be readily understood (Figure 4).

The yokes 15 occupy the spaces in the upper or cope section 2 between the end walls 3ª thereof, when properly positioned upon the core bars in transverse relation to the flask, said space, in each section, being free of the mold sand, as clearly shown in the drawings. With the head of the tie bolt engaged in the seat 7 and traversing the hole in the yoke, as described, the nut 21 is turned at each end of the flask to cause the core bars to be pressed down in the machined seats 13. The set screws 14 do not engage the core bars until after the yokes 15 are fastened down on the core bars. Tightening of the yokes causes a leverage between the yokes on top of the core bars and the machined seats 13 underneath the core bars, the seats 13 acting as fulcrums, and the downward pressure of the yokes raising the intermediate portions of the core bars. Usually, and preferably, the intermediate portions of the core bars are raised sufficiently to compensate for the natural sag of the core bars due to their weight and length, thereby making the core bars truly coaxial with the molds throughout their length.

After the yokes are fastened down and the intermediate portions of the bars are thus raised, the set screws 11 are adjusted. The pressure of these screws upward causes the yokes in turn to act as fulcrums, setting the intermediate portions of the bars slightly below center to a predetermined extent, so that the pressure of the molten metal will float the bars back to center instead of out of center, thus assuring uniformity in the thickness of the walls of the pipe or other tubular casting.

Great pressure may be brought to bear upon the end portions of the core bars to cause them to be supported rigidly in position with the desired amount of tension therein, and with a predetermined deflection, by means of the yoke acting in opposition to the set screws, and this degree of pressure may be equally distributed between the two core bars by the action of a single tie bolt, which has proven, in practice, to be a great advantage, as the two castings are made alike and the one adjustment serves for both.

In Figure 6 there is shown a drag section 22 having a substantially semi-circular cope bar opening 23 formed therein with vertical, parallel side walls 24 at its upper edges. At the lower ends of the vertical portions, there are formed undercut recesses 25 and the side walls are further provided with vertical grooves 26, into which there are adapted to be driven cut nails or other thin wedges 27, the lower ends of which may or may not engage with the rounded surface of the openings and be bent inwardly, as shown, when the core bars are in position. This makes a positive iron-to-iron engagement and effectually resists lateral movement of the intermediate portions of the core bars, due to the pressure of the inflowing metal.

From the foregoing it will be seen that simple means have been provided which may be readily incorporated in the drag sections of flasks for the manufacture of cast iron pipe or other tubular castings, said means serving to impart a deflection to the intermediate portions of the core bars to be overcome by the action of the metal in floating the same. The continuous beam action referred to not only causes the core bars to resist the tendency to move upward but also prevents sidewise movement to a prohibitively objectionable extent, thus insuring substantial uniformity of section throughout the entire length of the casting.

What is claimed is:—

1. Means for supporting a core bar in a flask comprising a bottom support consisting of machined webs, and independent elements carried by the flask and bearing on top of the core bar, properly spaced from the webs in the direction of the ends of the core bar, and adapted to exert a leverage to raise the latter at its central portion.

2. Means for supporting a core bar in a flask comprising a bottom support consisting of machined webs, independent elements carried by the flask and exerting pressure on top of the core bar in spaced relation to the webs in the direction of the ends of the core bar to exert a leverage to raise the latter at its central portion, and means outside of said independent elements for lifting the terminals of the core bar to overcome the raising of said central portion and deflect the same.

3. Means for supporting a core bar in a flask comprising vertically adjustable elements mounted near the ends of the flask to engage the extended ends of the core bar and constitute an end support for the latter, and independent elements located within the flask and bearing on top of the core bar and adapted to exert pressure thereon to depress the latter at its central portion, both the said adjustable elements and the said independent elements being carried wholly by the drag section of the flask.

4. Means for supporting core bars in a double flask comprising lugs formed on the ends of the drag section to the flask directly beneath the extended ends of the core bars, screws mounted in said lugs to contact with the extended ends of the core bars, a yoke arranged within the flask and bearing upon the top sides of the core bars, and means for exerting a downward pressure on said yoke to deflect the core bars at their centers, said means being connected to the drag section of the flask.

5. Means for supporting and centering a core in a flask comprising vertically adjustable elements arranged near the ends of the drag section to contact beneath the ends of the core bar and deflect the same, separate elements located within the cope section and bearing on top of the core bar adjacent to the ends thereof, and means connecting the last named elements to the drag section and adapted to draw the separate elements down upon the bar.

6. Means for supporting cores in a double flask to resist their floating upon the molten metal, said means comprising outstanding lugs formed on the ends of the drag sections of the flask and directly beneath the extended ends of the core bars, set screws threaded upwardly through said lugs to contact with and exert pressure upon the core bars, a yoke arranged adjacent to the inner face of each end wall of the cope section and bearing upon the top sides of the spaced core bars in spaced relation to the screws, and means for exerting a downward pressure on said yokes to deflect the bars at their centers, said means being connected to the drag section of the flask.

7. Means for supporting spaced, parallel cores in a double flask and resisting their rising at the central portions thereof by floating on the molten metal as the latter is poured, said means comprising upwardly adjustable supporting abutments carried by the drag section of the flask to contact beneath the extended ends of each core bar beyond the end walls of the drag, separate and removable yokes arranged transversely within the end walls of the cope section and adapted to bear upon the core bars in spaced relation to the supporting abutments, and a single, centrally disposed bolt connecting each yoke to the drag section and adapted to draw the same tightly down upon the core bars.

8. A double flask for casting pipe or other tubular objects and having cope and drag sections provided with core openings, said drag section having outwardly extending longitudinally disposed lugs carried by the end walls thereof and located beneath the core openings, vertically adjustable set screws mounted in the lugs and adapted to contact with and exert pressure upon the ends of the core bars, a longitudinally disposed arm formed at each end of the drag section, said arms having seats for removably receiving bolt heads, a separate removable yoke arranged transversely of the drag, the ends of the same resting on the core bars within the cope section, said yokes each having a central, vertical aperture, and a tie bolt traversing the aperture of each yoke and provided with a head to be removably seated in the longitudinal arm and having a nut to bear upon the yoke and bind the same on the core bars in a downward direction in opposition to the set screws.

9. A double flask for casting pipe or the like composed of cope and drag sections having core openings for permitting the ends of the core bars to extend therethrough, vertically adjustable abutments mounted on the ends of the drags to engage the ends of the core bars, yokes bearing on top of the core bars in spaced relation to the abutments, means for exerting a downward pressure on the yokes to flex the intermediate portions of the core bars in an upward direction, the core openings in the drag section having vertical grooves at the sides of the core bars, and wedges adapted to be driven into said grooves to bear against the sides of the bars to resist side movement thereof.

10. In a double flask for elongated tubular castings and composed of a cope and a drag section having complementary core bar openings, adjustable supports arranged exteriorly on and in spaced relation to the ends of the drag section and adapted to contact with the ends of the core bars where extended through said openings, longitudinal arms formed integrally with the drags and extending substantially along the longitudinal center line thereof from the inner faces of the end walls to the next adjacent transverse webs, said arms each having a seat provided with a transverse entrance opening, a yoke adapted to be placed with each end resting upon a core bar at each end of the same after the core bars have been positioned, said yokes each having a central bolt hole, tie bolts having heads to enter said seats and to traverse the yokes, and nuts for drawing the yokes down on the core bars.

11. Means for supporting elongated core bars in a horizontal position in flasks without the use of chaplets to resist movement of the same, comprising supporting means for supporting the core bar at points spaced from each end, means for exerting downward pressure on top of the bar at each end outside said supporting means so as to cause the bar to fulcrum on the supporting means and overcome sagging therein, and means for exerting upward pressure beneath each terminal of the bar to overcome the downward pressure and depress the center of the bar beneath the longitudinal axis of the mold, all of said means being carried by the drag section of the flask whereby when floating action takes place on the incoming molten metal it will bring the bar and core substantially in axial alignment and secure substantially uniform thickness in the walls of the casting.

12. Apparatus of the character described comprising, in combination, a flask having machined webs near its opposite ends, so shaped and of such dimensions as to provide seats for a core bar which is thereby held coaxial with the mold, except for intermediate sagging due to its weight; and adjustable elements at the opposite ends of the flask for exerting pressure on the core bar from above and below the same to deflect the intermediate portion of the core bar to the extent desired; said adjustable elements being spaced from each other longitudinally of the core bar and being located outside of the machined webs.

13. Apparatus of the character described comprising, in combination, a flask which is capable of receiving two core bars; and means connected to the flask at each end for exerting transverse pressure simultaneously upon both core bars near their ends, said means being so constructed and arranged as to equalize the pressure on the core bars, thereby to deflect them intermediately to an equal extent.

14. Apparatus of the character described comprising, in combination, a flask which is capable of receiving two core bars; and a yoke connected by a tie bolt to the flask at each end for exerting transverse pressure on both core bars near their ends, simultaneously and equally, when the tie bolt is tightened, thereby effecting deflection of both core bars by a single adjustment at each end of the flask.

15. Apparatus of the character described comprising, in combination, a flask having machined webs near its opposite ends, so shaped and of such dimensions as to provide seats for a core bar which is thereby held coaxial with the mold, except for intermediate sagging due to its weight; adjustable elements at the opposite ends of the flask for exerting pressure on the core bar from above and below the same to deflect the intermediate portion of the core bar to the extent desired; said adjustable elements being spaced from each other longitudinally of the core bar and being located outside of the machined webs; and adjustable means interposed between the flask and the core bar and located near said adjustable elements and adapted, when tightened, to deflect the core bar sidewise to compensate for the thrust of the molten metal as it flows into the mold.

16. Apparatus of the character described comprising, in combination, a flask having adjustable means at each end for exerting a pressure on a core bar from above; a pair of wedges adapted to be driven between the flask and the core bar to exert a pressure on the core bar along lines substantially horizontal; and a screw on each end of the flask outside the adjustable means and adapted to exert an upward pressure on the core bar, with said adjustable means then serving as fulcrums for the core bar, to effect downward deflection of the core bar; the wedges, when driven in tightly, causing the core bar to be deflected transversely.

JAMES R. McWANE.